United States Patent

Nowicki et al.

[11] Patent Number: 5,945,908
[45] Date of Patent: *Aug. 31, 1999

[54] DATA LOGGING TIRE MONITOR WITH CONDITION PREDICTIVE CAPABILITIES AND INTEGRITY CHECKING

[75] Inventors: Donald V. Nowicki, Lorain; Christopher A. Munroe, Norwalk, both of Ohio

[73] Assignee: Unicomm Signal, Inc., Canada

[*] Notice: This patent is subject to a terminal disclaimer.

[21] Appl. No.: 08/689,343

[22] Filed: Aug. 7, 1996

Related U.S. Application Data

[63] Continuation of application No. 08/192,672, Feb. 7, 1994, Pat. No. 5,559,484, which is a continuation-in-part of application No. 07/699,758, May 14, 1991, Pat. No. 5,285,189.

[51] Int. Cl.$^6$ ..................................... B60C 23/00
[52] U.S. Cl. ............... 340/447; 73/146.5; 200/61.25; 340/442
[58] Field of Search ........................ 340/447, 445, 340/442; 73/146.4, 146.5; 200/61.25, 61.22

[56] References Cited

U.S. PATENT DOCUMENTS

| | | | |
|---|---|---|---|
| 3,938,077 | 2/1976 | Nakanishi | 200/61.25 |
| 3,950,726 | 4/1976 | Fujikawa et al. | 200/61.25 |
| 4,048,614 | 9/1977 | Shumway | 200/61.25 |
| 4,074,227 | 2/1978 | Kalmus | 340/447 |
| 4,075,603 | 2/1978 | Snyder et al. | 200/61.25 |
| 4,090,172 | 5/1978 | Vesnic | 200/61.25 |
| 4,117,452 | 9/1978 | Snyder et al. | 200/61.23 |
| 4,131,877 | 12/1978 | Stewart et al. | 200/61.25 |
| 4,160,234 | 7/1979 | Karbo et al. | 200/61.23 |
| 4,210,898 | 7/1980 | Betts | 200/61.23 |
| 4,237,728 | 12/1980 | Betts | 73/146.5 |
| 4,286,253 | 8/1981 | Nagy | 200/61.25 |
| 4,311,985 | 1/1982 | Gee et al. | 200/61.22 |
| 4,363,020 | 12/1982 | Venema | 340/447 |
| 4,376,931 | 3/1983 | Komatu et al. | 340/447 |
| 4,384,482 | 5/1983 | Snyder | 73/146.5 |
| 4,455,682 | 6/1984 | Masters . | |
| 4,507,956 | 4/1985 | Schlesinger et al. | 73/146.5 |
| 4,510,484 | 4/1985 | Snyder et al. | 73/146.5 |
| 4,511,869 | 4/1985 | Snyder et al. . | |
| 4,531,112 | 7/1985 | Thomas | 73/146.5 |
| 4,695,823 | 9/1987 | Vernon et al. | 73/146.8 |
| 4,717,905 | 1/1988 | Morrison, Jr. et al. | 340/447 |
| 4,909,074 | 3/1990 | Gerresheim et al. | 340/442 |
| 4,947,151 | 8/1990 | Rosenberger | 340/447 |
| 4,970,491 | 11/1990 | Saint et al. | 340/447 |
| 5,001,457 | 3/1991 | Wang | 340/447 |
| 5,061,917 | 10/1991 | Higgs et al. | 340/447 |
| 5,081,443 | 1/1992 | Breit | 340/426 |
| 5,109,213 | 4/1992 | Williams et al. | 340/447 |
| 5,285,189 | 2/1994 | Nowicki et al. | 340/447 |
| 5,289,160 | 2/1994 | Fioretta | 340/447 |
| 5,559,484 | 9/1996 | Nowicki et al. | 340/447 |

OTHER PUBLICATIONS

Automotive Industries, Jan. 1987, p. 29 "Michelin's MTM", Lindsay Brooke.

*Primary Examiner*—Brent A. Swarthout
*Attorney, Agent, or Firm*—Paul A. Guss; Mark M. Yang

[57] ABSTRACT

A device is provided for sensing a condition of a non-rotating pneumatic tire preferably of the type used on an automobile wherein the tire is mounted on a tire rim. The device comprises a housing, a band for mounting the housing to the tire rim, a sensor for monitoring the condition within the tire, circuitry operatively connected to the sensor for generating radio signals indicative of the tire condition, a power supply operatively connected to the circuitry, an externally controlled switch, and a receiver for receiving the radio signals. The externally controlled switch is manually or electromagnetically operable to cause the condition sensor to generate radio signals when the pneumatic tire is stationary. A method of mathematically cross-linking data and identification information is provided to ensure data integrity. Also, the system includes a data logging capability for storing time series tire condition information for use as a historical log of tire use. Predictive capabilities retrieve manufacturer's specifications stored in a memory for comparison against real time use data to predict or otherwise anticipate possible hazardous conditions or tire life expectancy.

7 Claims, 7 Drawing Sheets

DATA LOGGING TIRE MONITOR WITH CONDITION PREDICTIVE CAPABILITIES AND INTEGRITY CHECKING

CROSS REFERENCE TO RELATED APPLICATIONS

This application is a continuation of Ser. No. 08/192,672, filed Feb. 7, 1994, now U.S. Pat. No. 5,559,484 which is a continuation-in-part of application Ser. No. 07/699,758, filed May 14, 1991, now U.S. Pat. No. 5,285,189. The teachings of these patents are wholly incorporated herein by reference.

FIELD OF THE INVENTION

The present invention relates to radio frequency tire condition monitoring systems and more particularly to methods and apparatus for providing security to data transmitted within such radio frequency systems.

The invention relates also to tire monitoring systems which accumulate, process and store tire and vehicle condition information for the purposes of providing accumulated tire degradation information for advanced warning of potential tire failure as well as historical data useful as warranty information.

The invention further relates to tire monitoring systems providing alternate methods of manually or artificially activating the individual tire transmitters within the system for testing and maintenance.

DESCRIPTION OF RELATED ART

Whenever data or other information is encoded and transmitted by radio frequency RF means, there exists a potential for loss of data or miscommunication of the data. The integrity of the data is critical to well-behaved RF systems. In that regard, some prior art RF systems have experienced the problem, under certain circumstances, that the data received and decoded is incomplete, or worse, contains misinformation. Disruptions to data security or integrity can be attributable to various factors such as extremes in noise and strength variations in the received signal. These errors including factors are more pronounced in systems such as that of the present invention wherein the transmitting device is in rotational motion with respect to a stationary receiver.

Most prior art systems that transmit information by means of RF utilize an identification code in conjunction with the data. The receivers are trained to recognize only data accompanied with a predefined correct system identification code. This identification code is required to differentiate between multiple transmitters. For example, garage door openers use user-resetable switches which must match between transmitter and receiver to effect door motion. Although an identification code yields a means of security from false actuation by other transmitters, it does not offer security to protect against data disruption during the transmission and decoding of data within a single RF system.

A simple prior art method of adding security to the received data has been to decode two successive transmissions and verify that they match. Another possible security option has been to add a series of extra data bits to each transmission representing the checksum of the data information to be transmitted. Both methods listed above require the receiving device to check or otherwise verify the transmitted data twice. The problem with both of these security measures is that both require more time for the receiver to receive and properly decode a transmitted signal. This can become burdensome or unworkable in systems that are sensitive to transmission time. This is particularly true in low tire warning systems which have transmitters mounted on a wheel or within a tire. As the transmitter spins around with the rotating tire, periods exit when the data being transmitted is not detectable by a centrally mounted receiver. Likewise, there exists windows of opportunity for good communication between the transmitters and the receiver. Generally, the shorter the required transmission time for a secure decode, the better the communication will be. Therefore, there exists a need for a system which is capable of transmitting data as well as security or integrity information quickly and without unnecessary overhead.

Currently, transmitters of this type application are activated by a centrifugal switch mounted on the transmitter circuit board in the radial direction, with respect to tire rotation, so the switch's electrical contacts are open when the tire is not rotating and are closed at some rotating speed in which the centrifugal switch's acceleration rating is exceeded.

It is desirable to activate transmitters after they are installed in a tire/wheel for various reasons, such as to troubleshoot for system problems, to ensure that the proper transmitter is installed in the correct vehicle position, and to allow the receiver to learn the position and identifier code of each sensor on a vehicle. In order for these procedures to be effective, there is a need to activate the transmitters one at a time in a controlled manner so the operator is aware which transmitter is active during the procedure. The prior art systems require the rotation of one tire/wheel/transmission assembly. Accomplishing this requires expensive equipment to rotate the tires individually, such as on a dynamometer.

The present tire monitoring systems provide immediate tire condition information (i.e. pressure, temperature) to the driver, but do not attempt to assess tire damage due to driving on a tire in an abnormal condition. It is desirable to warn the driver of a tire condition problem immediately and to have the problem corrected by sealing the leak and/or inflating the tire to the proper pressure. In most cases, the driver and repair technician are unaware of any possible internal tire damage, such as rubber compound, belt or laminate degradation. The tire is normally placed back into service presenting the possibility of catastrophic and/or premature tire failure with little or not advanced warning.

SUMMARY OF THE INVENTION

The present invention provides a method and apparatus for adding security to data being transmitted without the additional overhead of checksum bits or redundant matching signals. By mathematical means, the data and identification codes to be transmitted are crosslinked together to add security and data integrity during the decoding. This method works for systems that incorporate a number of identification bits along with the data to be transmitted. By crosslinking the data with the identification code bits, if the decoding of the data is detected incorrect, then all aspects of the transmission, including the data and identification bits, will be in error. The receiver then aborts the decoding when the identification bits do not match the identification code selected. Therefore, security and data integrity has been achieved.

BRIEF DESCRIPTION OF THE DRAWINGS

The invention may take physical form in certain parts and arrangements of parts, the preferred embodiments of which will be described in detail in this specification and illustrated in the accompanying drawings which form a part hereof and wherein.

DETAILED DESCRIPTION OF THE INVENTION

Figure 1:
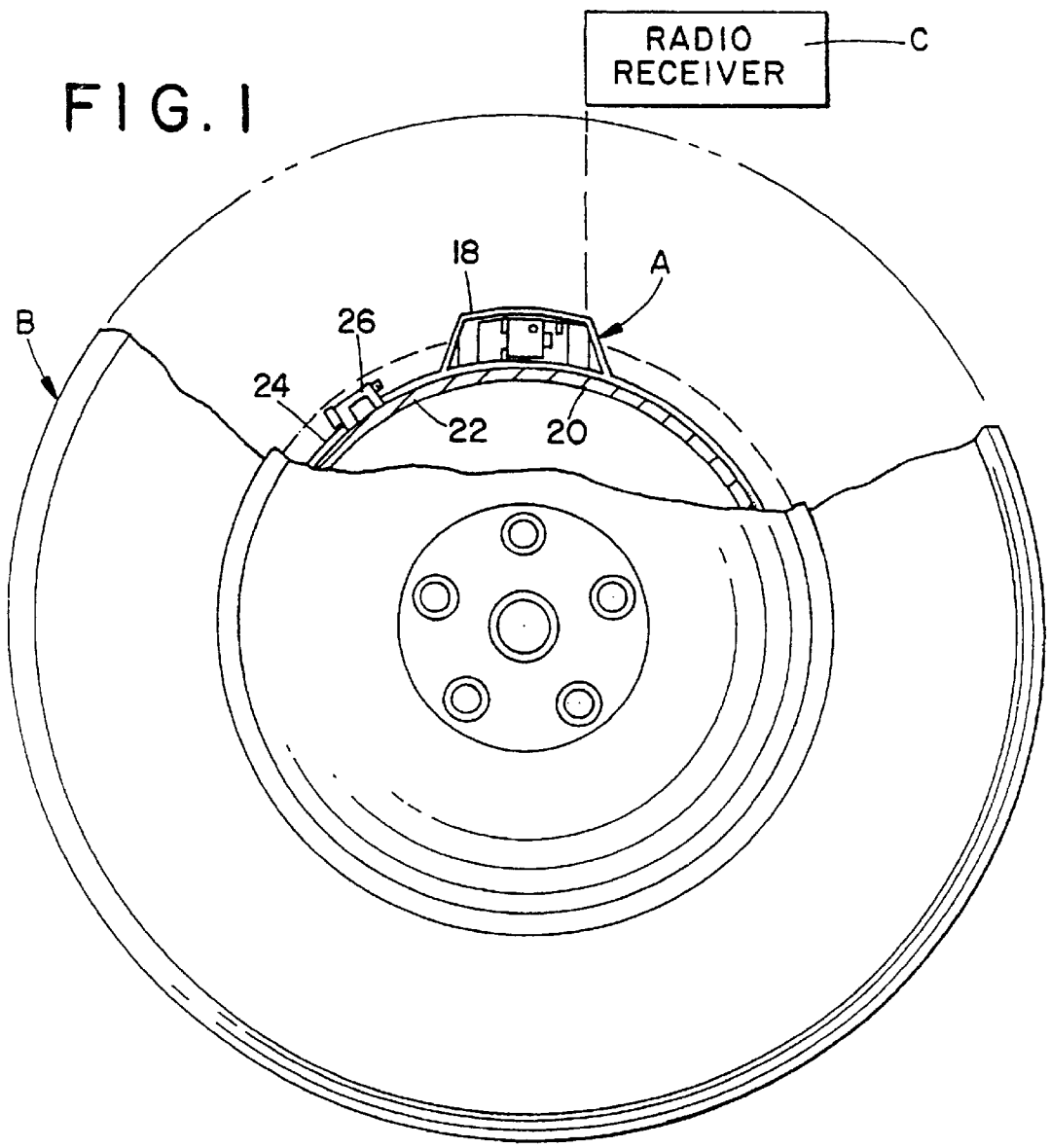
FIG. 1 is a side elevational view in partial cross-section of a vehicle wheel assembly having the radio transmitter device of the present invention installed thereon and operatively connected to a radio received.

Referring now to the drawings which are for the purposes of illustrating the preferred embodiments of the invention only and not for the purposes of limiting same, the FIG-URES show a radio frequency tire condition monitoring system including a radio transmitter device A adapted for mounting on a pneumatic vehicle tire B and adapted for radio communication with an associated receiver C. The transmitter device A includes a transmitting circuit 10, a control circuit means 12, and a battery power supply means 14 for providing electrical energy to the circuit.

Figure 2:
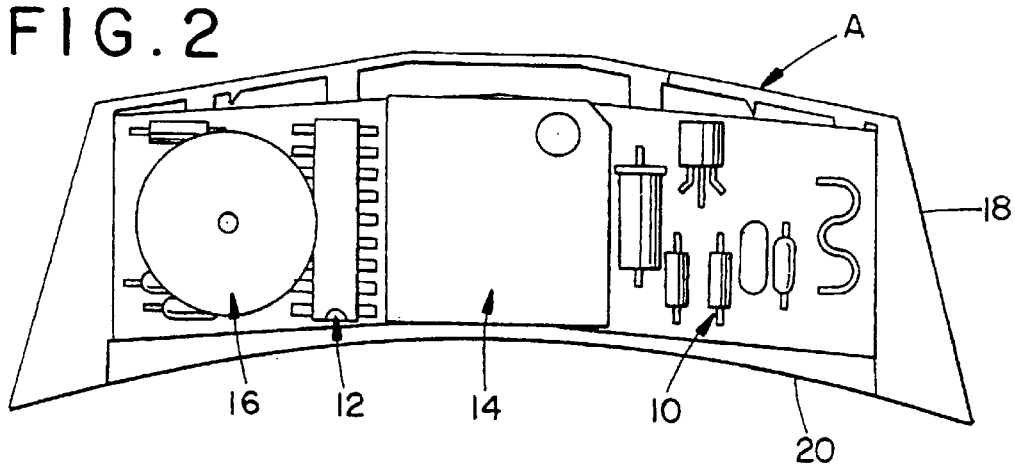
FIG. 2 is an enlarged cross-sectional view of the device shown in FIG. 1.

More specifically, and with particular reference to FIGS. 1 and 2, transmitter package A includes a radio frequency transmitting circuit 10 for use in a tire condition monitoring system. A plurality of various tire condition sensors, shown as a single sensor 16, senses a variety of physical conditions of the tire, such as pressure for example. The sensor 16, in association with the control circuit 12 and the radio transmitting circuit 10 powered by battery means 14, initiates an identifying signal to an associated central radio receiver C in the form of an identification code as diagrammatically shown in FIG. 1. The radio circuit 10, control circuit 12, sensors 16, and battery means 14 are contained in a housing 18 formed of plastic or the like, and including a base wall 20 which is configured for close reception against the wheel rim 22 in the tire wheel cavity. The housing 18 is attached by means of a band 24 and adjustable tightening means 26 in a manner well known in the art.

Methods and Apparatus for Transmitter Activation

Figure 3:
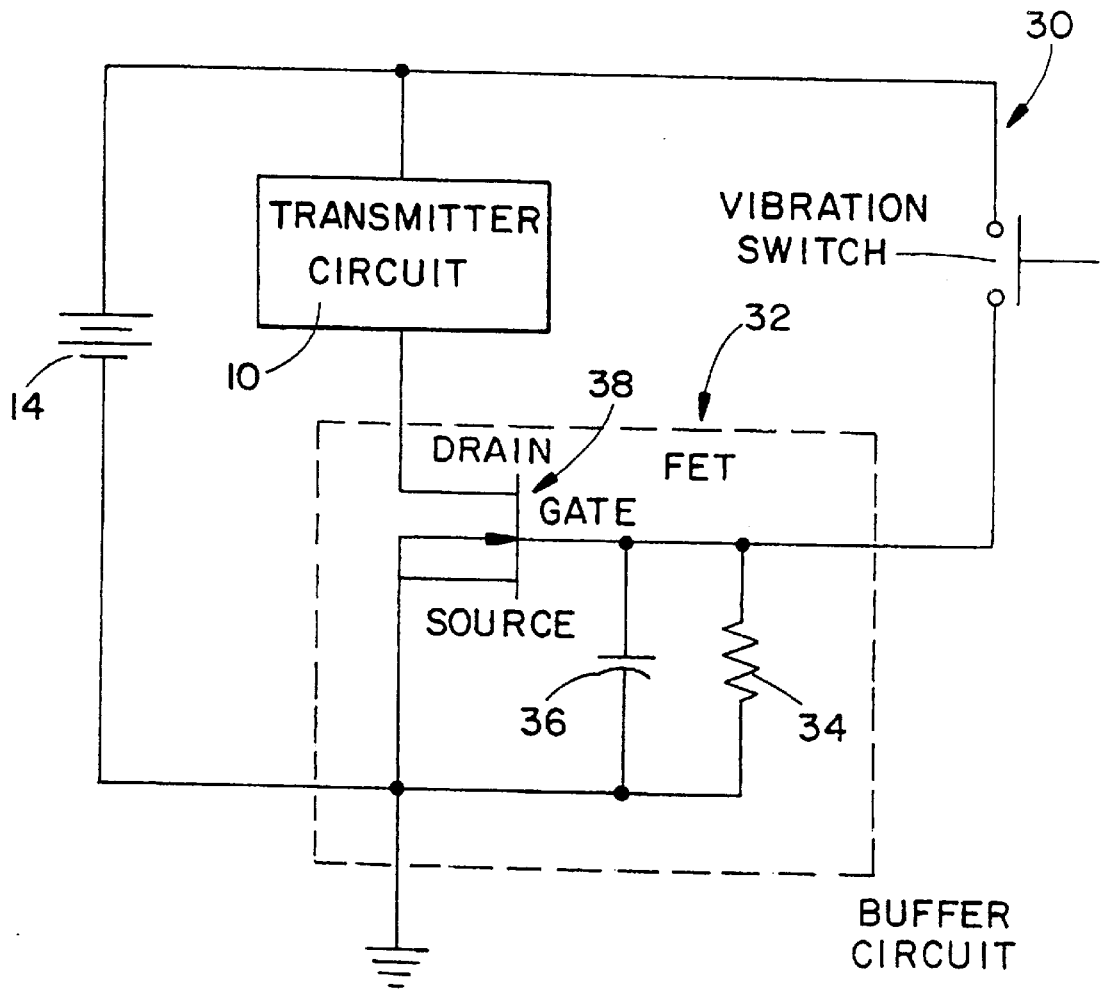
FIG. 3 is an electrical schematic diagram of a transmitter device according to an embodiment of the invention.
Figure 4:
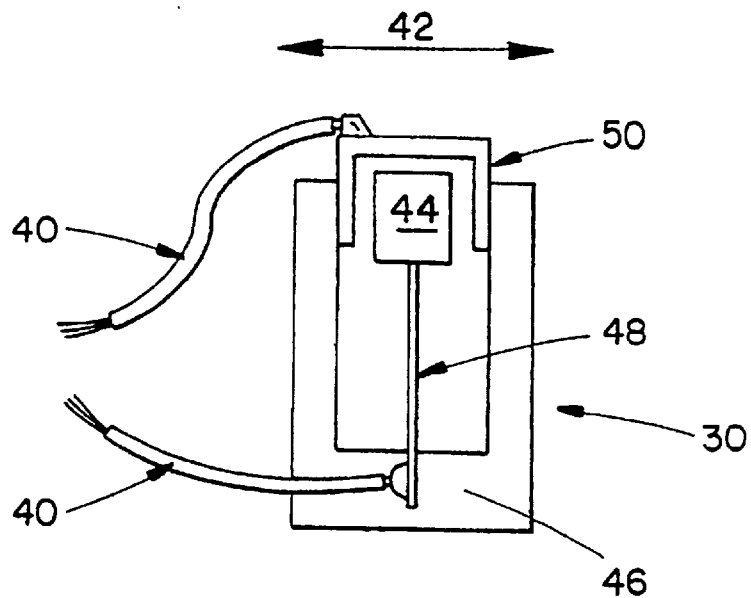
FIG. 4 is an electromechanical diagram of a switch used in the circuit of FIG. 3.

Referring now to FIGS. 3 and 4, a first method and apparatus for transmitter activation in a non-rotating tire will be described. The transmitter circuit itself 10, as well as the sensors (not shown), for sensing physical tire conditions are essentially the same as described in our co-pending application incorporated by reference hereinabove. However, in order to activate the transmitter in a non-rotating tire, a vibration switch 30 is provided to activate the transmitter responsive to a predetermined level of vibration. A buffer circuit 32 is included between the switch 30 and the transmitting circuit 10 to "debounce" the switch using a resistor 34, a capacitor 36, and a field effect transistor FET 38. The switch 30 and buffer 32 combination replaces the centrifugal switch of our earlier system referred to above.

In general, most tire warning/monitoring systems require tire, wheel, and transmitter rotation in order for activation and generation of a signal. The various embodiments of the instant invention described herein permit transmitter activation simply by vibrating the transmitter, such as by a blow to the tire with a technician's mallet. Of course, the vibration switch 30 closes under normal driving conditions as well.

With reference to FIGS. 3 and 4 in detail, the vibration switch 30 is constructed in a cantilever configuration having a pair of normally open contacts 40 which are normally open when the transmitter is at rest. The contacts 40 momentarily close when the transmitter A is subjected to acceleration in the direction 42 illustrated. The switch includes a vibrating mass 44 which is connected to a non-conductive frame 46 using an electrically conductive spring beam 48. The mass 44 is electrically conductive and is positioned between a horseshoe-shaped contact member 50. The contact member 50 is connected to a first conductor of the normally open contacts 40 and the spring beam 48 is connected to the second conductor of the pair within the contacts 40. The circuit is completed, or closed, when the mass 44 touches either side of the member 50.

The vibration switch 30 is mounted within the transmitter A package in an orientation such that the direction of movement 42 of the switch is tangential to the direction of tire rotation. This ensures that the switch is momentarily vibrated closed whenever the tire/wheel/transmitter assembly is accelerated due to contact between the rotating tire and the road surface.

The momentary closure of the switch 30 results in application of power from the battery 14 to the buffer circuit 32. The battery voltage applied to the gate of the FET 38 motivates conduction of current through the drain and source of the FET. This current causes the transmitting circuit 10 to power-up by effectively pulling the circuit 10 to ground through the FET 38. The capacitor 36 acts as a voltage storage device to maintain the voltage on the gate of the FET 38 for several seconds so that the transmitting circuit 10 remains activated during transitional states of the vibration switch 30. The resistor 34 provides a current path to bleed the capacitor 36 of charge over a period of several seconds whenever the tire is at rest.

The vibration switch 30 and the buffer circuit 32 are preferably tuned with each other, as well as tuned for a particular sensitivity level overall. More particularly, the electrical time constant provided by the buffer circuit 32 is matched to the mechanical time constant provided by the vibrating mass 44 and spring beam 48 combination. The overall circuit behavior or sensitivity is tuned to a particular application and/or end use or vehicle.

Figure 6:
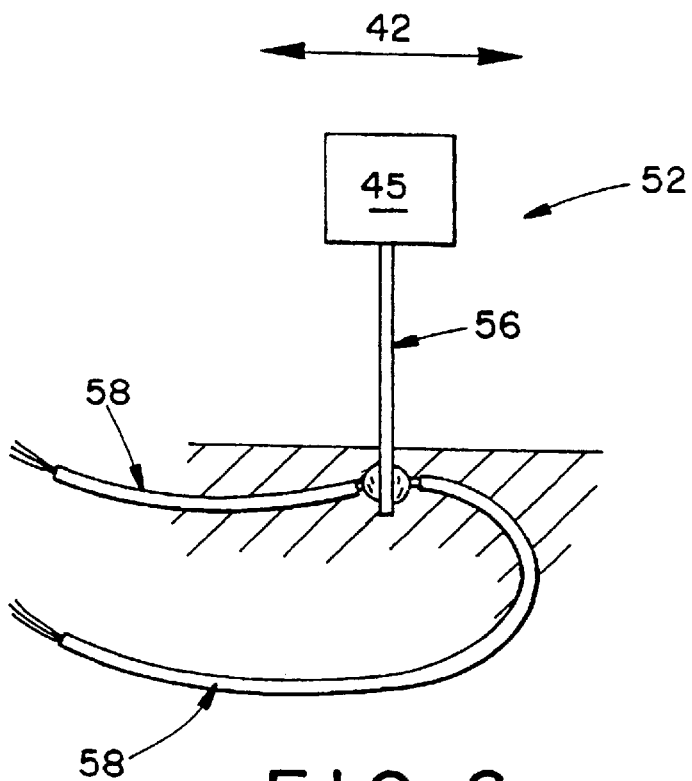
FIG. 6 is an electromechanical diagram of a power generator device used in the circuit of FIG. 5.
Figure 5:
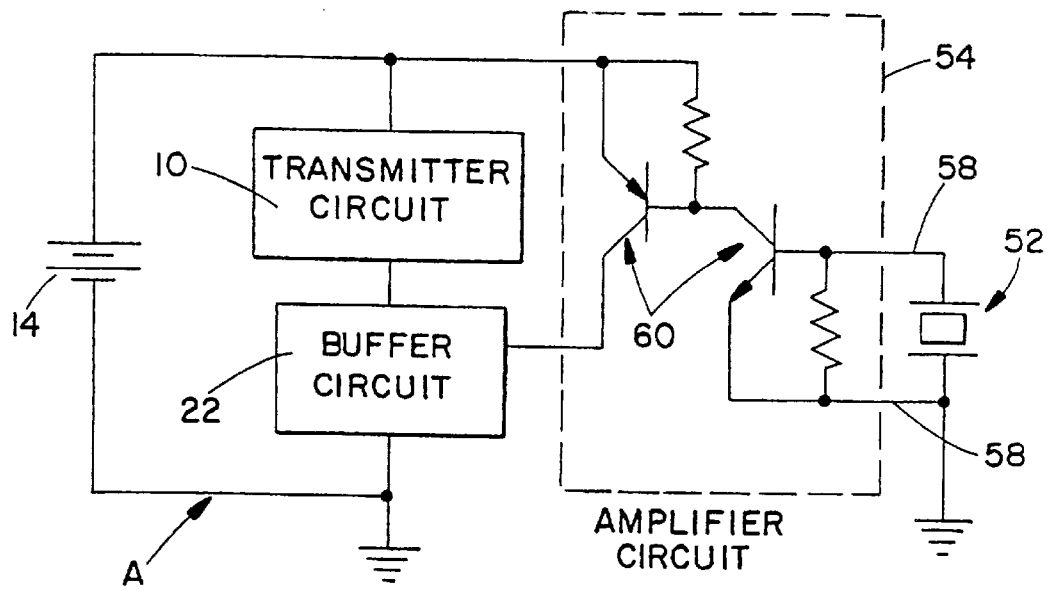
FIG. 5 is an electrical schematic diagram of a transmitter device according to another embodiment of the invention.

The transmitter A is activated by a vibrating piezo power generator 52 in FIGS. 5 and 6. With reference now to those figures, the transmitter A includes a battery 14 a transmitting circuit 10, a buffer circuit 32, a power generator 52, and an amplifier 54.

The vibrating piezo power generator 52 is preferably of a cantilever design, as illustrated best in FIG. 6. The generator 52 includes a vibrating mass 45 and a beam member 56 constructed of laminations of piezo electric material for generating an electrical voltage as the beam deflects or otherwise bends. The voltage generated by the beam is carried to the amplifier 54 by a pair of conductors 58 which are attached to a fixed end of the beam member 56. The vibrating piezo electric power generator 52 generates sufficient power to drive the amplifier whenever subject to acceleration in the direction 42 perpendicular to the longitudinal axis of the cantilevered beam member 56. The direction of movement 42 of the vibrating beam member 56 is longitudinal or tangential with respect to the direction of tire rotation. Thus, it is seen that the generator 52 produces pulsed voltages whenever the tire/wheel/transmitter is accelerated due to contact between the rotating tire and the road surface.

With reference to FIG. 5, in conjunction with FIG. 6, the overall operation of the transmitter A will be described in greater detail. As indicated above, the deflection of the laminated piezo electric beam member 56 produces a voltage pulse across the pair of conductors 58. This pulse momentarily turns on the amplifier 54 which, in turn, drives the transmitting circuit 10 through the buffer circuit 32 in a manner similar to that described above in connection with the vibration switch 30. The buffer circuit 32 is as illustrated in FIG. 3 and includes the resistor 34 and capacitor 36 for providing a selectable time delay function. In this embodiment, the amplifier circuit 54 preferably includes a pair of discrete transistors 60 for applying a proper voltage level to the buffer circuit sufficient to trigger the buffer circuit and, in turn, effecting operation of the transmitting circuit 10. The pair of transistors 60 and the amplifier 54 also work to minimize the current leakage from the battery 14 when the vibrating piezo power generator 52 is not active. This is accomplished through proper selection of impedance parameters.

As with the vibration switch discussed above, the instant vibrating piezo power generator 52 an buffer circuit 32 are preferably tuned with each other, as well as tuned for a particular sensitivity level overall. More particularly, the electrical time constant provided by the buffer circuit 32 is matched to the mechanical time constant, as well as voltage gains provided by the vibrating mass and amplifier circuit combination. The overall circuit behavior or sensitivity is tuned to a particular application and/or end use or vehicle.

Figure 7:
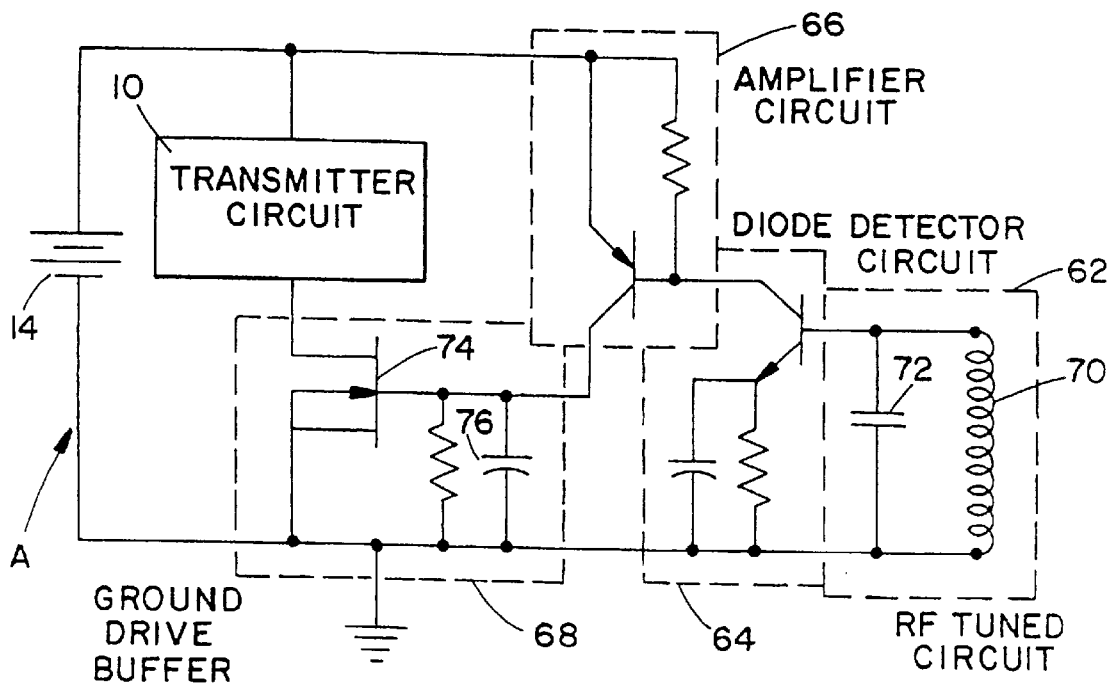
FIG. 7 is an electrical schematic diagram of a transmitter device according to yet another embodiment of the invention.

FIG. 7 illustrates yet another embodiment of an apparatus for transmitter activation in a non-rotating tire. Referring now to that figure, the transmitter A includes a battery 14 and RF transmitting circuit 10, a radio frequency tuned circuit 62, a diode detection circuit 64, an amplifier 66, and a ground drive buffer circuit 68.

The radio frequency tuned circuit 62 comprises an inductor 70 and a capacitor 72 connected in parallel as illustrated. The inductance and capacitance of the circuit elements are selected to produce an alternating voltage signal across the pair when subjected to an electric field alternating at the resonant frequency of the tuned circuit 62. The amplitude of the output voltage from the tuned circuit 62 is proportional to the applied electromagnetic field strength as well as proportional to the strength or degree of the frequency match between the applied electromagnetic field and the resonant frequency of the tuned circuit 62.

The outputs of the radio frequency tuned circuit 62 are connected to a transistor diode detector circuit 64 which performs a detection of the alternating voltage from the tuned circuit 62. The detector circuit 64 also drives the amplifier circuit 66 whenever the alternating voltage is detected.

The output of the transistor diode detector circuit 64 is connected to a ground drive buffer circuit 68 for energizing the transmitting circuit 10 in a manner described above in conjunction with the system of FIGS. 3–6. The ground drive buffer circuit 68 includes a MOSFET device 74 having a high input impedance and a large charge-holding capacitor 76. The capacitor 76 is selected to maintain the power applied to the transmitting circuit 10 for a period of time well beyond that possible with only the enabling signal generated by the detection circuit 64 and the RF tuned circuit 62.

The system illustrated in FIG. 7 provides for energizing single transmitter units mounted within the tire of a vehicle merely by transmitting an amplitude modulated a.m. signal matching the resonant tuned frequency of the RF tuning circuit 62. It is desirable that each of the four transmitters on a vehicle be tuned to react to a different resonant frequency. Then, individual transmitter excitation is facilitated for purposes such as testing, maintenance, or to train the common receiver to recognize the installed set of transmitters.

Preferably, each of the transmitters is individually energized, one at a time, using a hand-held a.m. transmitting device transmitting a low power signal having a variety of selectable frequencies. Alternatively, each of the RF tuned circuits 62 within transmitters A are tuned to a single common frequency. In this case, the hand-held exciter unit transmits the a.m. signal at the common frequency, but at a very low power level. The hand-held unit must then be placed in very close proximity to the target transmitter in order to sufficiently excite the RF tuned circuit on the transmitter within the tire. Other transmitters within the remaining tires of the vehicle are unaffected as the signal from the exciter unit is selected to be too weak to develop the necessary activity in the diode detection circuits 64.

In either case, the hand-held exciter unit facilitates reprogramming of the tire monitor transmitter position information. Also, for the system using distinct tuning frequencies, a centrally located transponder unit could easily individually poll each of the transmitters to gather tire condition information while the vehicle is stationary or in motion.

Receiver Unit with Predictive and Logging Capabilities

Figure 8:
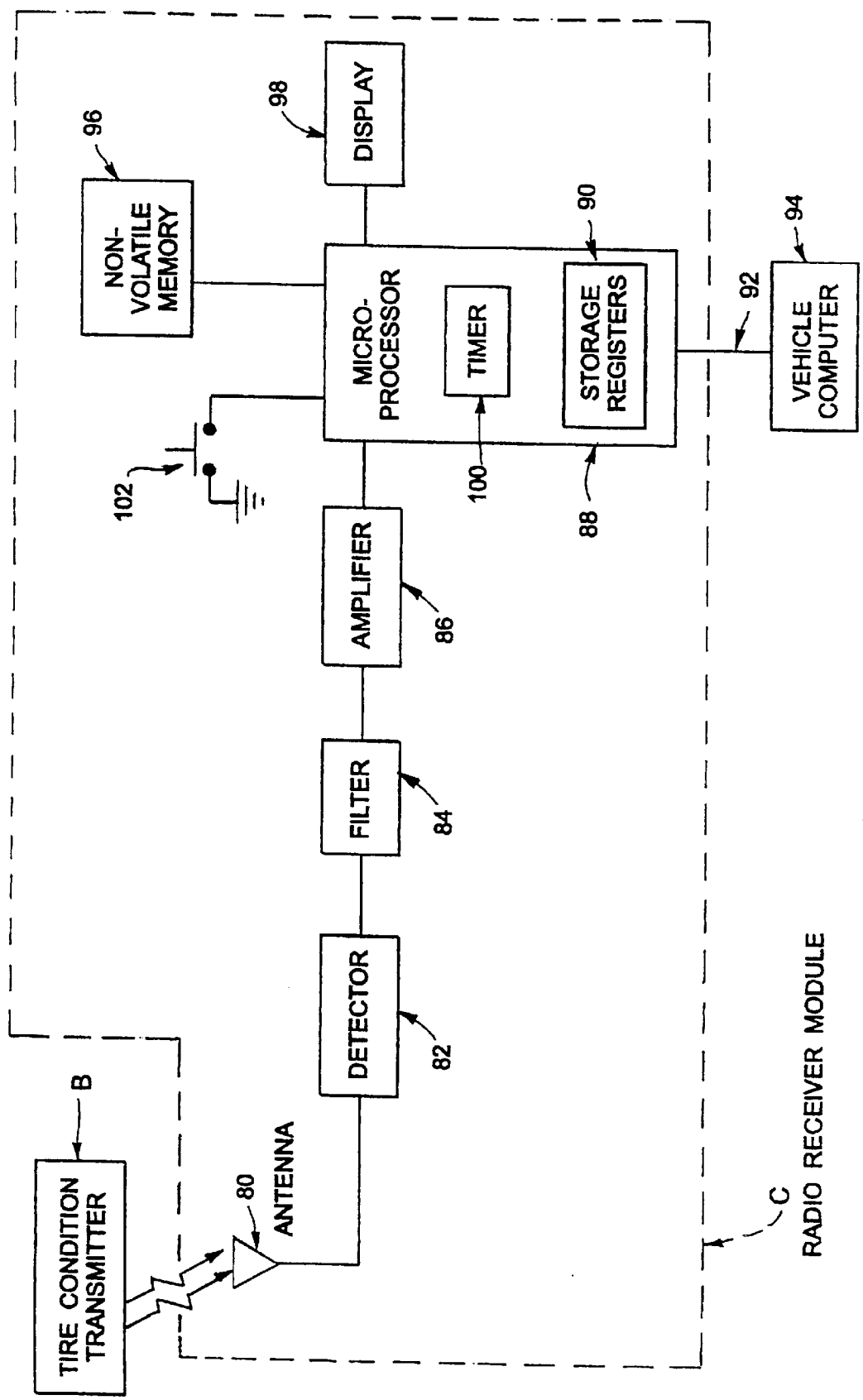
FIG. 8 is an electrical schematic diagram of a receiver device according to an embodiment of the invention; and, FIG. 9 is a flow chart illustrating a procedure performed by the receiver of FIG. 8; and, FIG. 10 is an electrical schematic diagram of a transmitter device according to another embodiment of the invention.

Attention will next be directed to improvements in the receiver unit C within the tire monitor system illustrated generally in FIGS. 1 and 2. FIG. 8 illustrates a tire condition monitoring system capable of determining the life expectancy of a tire based upon observed historical physical conditions. Tire history information is accumulated and compared against pre-programmed tire condition specifications stored in a memory. The comparison results are used to predict and display estimated life expectancy conclusions and other critical information.

Referring to that figure in greater detail, the receiver C includes an antenna 80 for receiving periodic radio signals from the plurality of transmitters A mounted within the vehicle tires as discussed above and particularly set forth in our co-pending application. The periodic signal received on the antenna is detected by a signal detector 82, filtered by a signal filter 84 and amplified in a suitable amplifier 86. A microprocessor 88 includes means for decoding data embedded in the signal received from the amplifier 86. The decoded tire condition information is stored in a register 90 or other memory within the microprocessor for further processing.

Speed and load information is delivered to the microprocessor 88 via a serial communication link 92. The link connects the vehicle computer module device 94, provided by the vehicle o.e.m. to the microprocessor 88 using suitable hardware. The various information input is updated on a periodic basis so that contention for processing power never becomes a bottleneck. Serial communication to the vehicle computer is somewhat common and well known to those skilled in the art so that further explanation is not necessary. An example is a slave device (receiver module C) which is effectively polled by a master device (vehicle computer 94). Vehicle speed, load, and other information is temporarily stored in one of the processor's registers 90 or other dedicated memory means for further processing. Tire condition information such as temperature and/or pressure is compared against respective programmed values or against previously stored data maintained in the system's non-volatile memory means 96. Appropriate action is taken based upon the results of the comparison.

Pre-programmed data values represent system limits which trigger an event or sequence of events or other suitable action. These events include, but are not limited to: outputting a message to the vehicle driver on a display unit 98, activating a receiver-based timer 100, storage of accumulated data values in the non-volatile memory means 96, calculation of tire damage resulting from current tire temperature and/or pressure conditions, calculation of accumulated aggregate tire damage over the life/use of the tire, or calculation of the expected tire life under current tire conditions.

The events or actions taken by the receiver C are both singular and sequential to obtain their desired results. However, a major advantage of the system illustrated in these figures, is the ability to process tire condition information, vehicle information, and time data in a meaningful way in order to provide up-to-date and accumulated information regarding predicted tire degradation from various abnormal conditions. These conditions may vary depending upon application and end use of the system, but primarily include tire pressure, temperature, and speed. The system provides advanced warning to the driver of potential tire failure based upon accumulated information concerning abnormal tire conditions. Tire degradation information is stored in the non-volatile memory 96 for on-demand access via a suitable radio receiver, microprocessor, input interrupt switch 102, or the like. This information may also be simultaneously displayed on the display unit 98.

Comparisons and calculations used to generate meaningful information, alarms, actions, etc. regarding tire degradation vary greatly both in form and in complexity based upon the desired outputs and application. Normally, comparisons and calculations are made according to the tire manufacturer's recommendations.

As an example, a manufacturer may recommend replacing a tire exposed to: (i) temperatures above 100° C. for more than two (2) hours; (ii) a tire driven over two hundred (200) miles (time×vehicle speed) with less than 20 pounds of pressure (20 psi); or, (iii) a tire exposed to a speed exceeding its maximum rated speed. Obviously, a large number of different comparisons are possible within the system of the preferred embodiment based upon the various physical conditions sensed by the sensors 20 and reported by the vehicle computer 94 including: tire pressure, tire temperature, vehicle speed, vehicle load, and time duration.

Example cases 1–6 follow below wherein certain input conditions generate certain output actions using the system illustrated in FIG. 8.

EXAMPLE DECISION TABLE

|  | Example Cases | | | | | |
| --- | --- | --- | --- | --- | --- | --- |
|  | 1 | 2 | 3 | 4 | 5 | 6 |
| Input Conditions |  |  |  |  |  |  |
| Pressure < 20 psi |  | X | X | X | X | X |
| Pressure < 5 psi |  |  | X | X | X | X |
| Temperature > 100 degrees C. |  |  |  | X | X | X |
| Speed > 65 MPH |  |  |  |  |  | X |
| Load > 1000 lbs. |  |  |  |  | X |  |
| Time > 1 Hour |  |  |  |  | X |  |
| Output Conditions |  |  |  |  |  |  |
| Store Information in Diagnostic Memory |  | X | X | X | X | X |
| Display Pressure |  | X | X | X | X | X |
| Display - "Expected Tire Life 50 Miles" |  |  | X |  |  |  |
| Display - "Expected Tire Life 10 Miles" |  |  |  | X |  |  |
| Display - "Expected Tire Life 0 Miles" |  |  |  |  | X | X |

Figure 9:
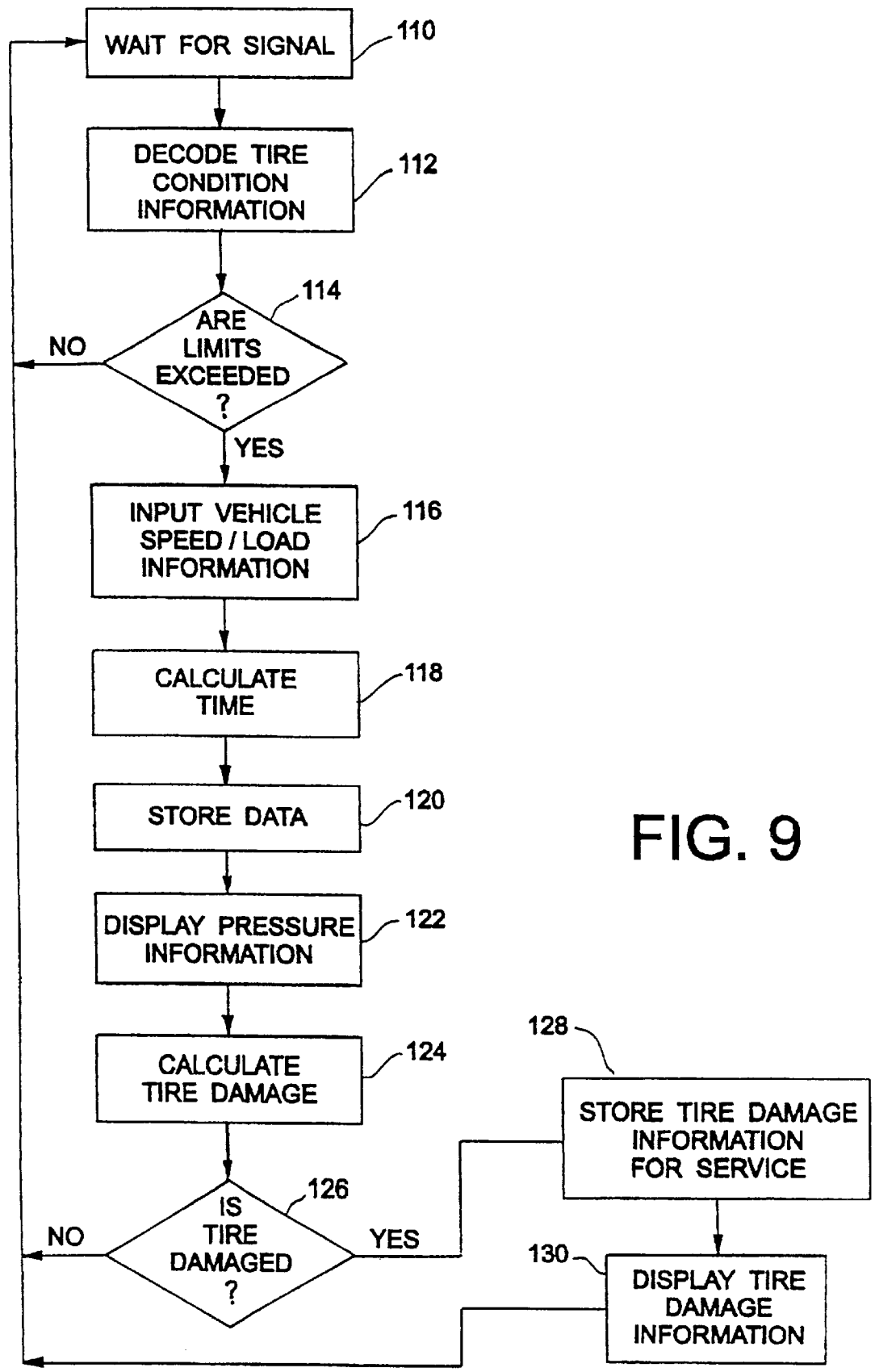

The basic operation of the receiver C will now be described below with particular reference to the flow chart of FIG. 9. Initially, at step 110, the receiver C waits for a signal to arrive from one of either of the transmitter A or the vehicle computer module device 94 via the serial communications links 92. Once a signal is received, the information is decoded therefrom at step 112 in a manner to be described in greater detail below.

Next, at step 114, the decoded tire condition data is compared against the previously stored parameter data in the non-volatile memory 96. If none of the limits are exceeded and all minimum values are met, the flow returns to a wait state to idle until another signal is received.

However, when a limit is exceeded or a minimum condition is not met, the vehicle speed and load data is inputted at step 116 from the vehicle computer module device 94 to the microprocessor 88. A timer is started at step 118, or the real time is determined for use at a later time to calculate distance traveled (speed×time=d). All of the above data are stored in the memory 96 at step 120. In the event that the tire pressure was measured low, the pressure is displayed immediately to the driver on the display unit 98 at step 122.

After a number of successive passes through the steps 116–122, actual tire damage is calculated at step 124 based upon a comparison of time, speed, temperature, load, etc. with the data previously stored in the non-volatile memory 96. As a safety precaution, if the tire is determined to be damaged at step 126, the receiver stores this information in the memory 96 at step 128 and immediately displays a message and/or sounds an audible alarm at step 130 alerting the driver of a possible unsafe condition. If the tire is determined not to be damaged, steps 110–126 are repeated, creating a log of tire condition data in the non-volatile memory 96.

Direct Pressure Read-Out Transmitter

Figure 10:
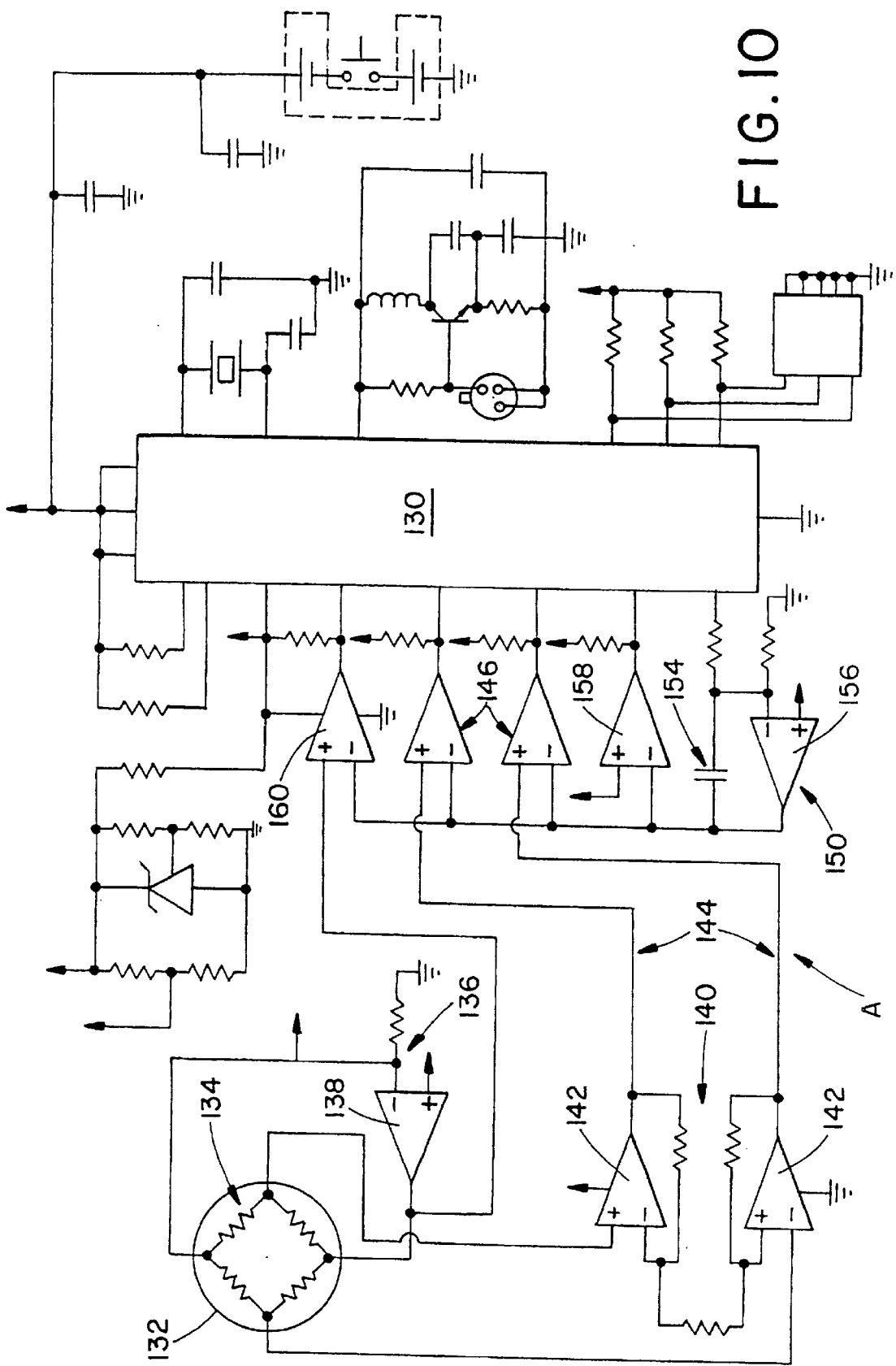

With reference now to FIG. 10, a direct pressure read-out transmitter A for use in the above system will be described in detail. The transmitter A uses a microcontroller 130 to perform the various logical and other functions. Preferably, the microcontroller is a model PIC16C54XT/I manufactured by Microchip. This chip is desirable mainly for its ability to operate in and out of a low current mode using software commands. This low current mode, or low power consumption mode, as described in our earlier co-pending application prolongs the life of the battery. Using software, the microcontroller 130 enters into a "sleep" mode upon execution of a "sleep" software command and, conversely, wakes up approximately every 2.5 seconds using an on-board watchdog timer. During the sleep mode, all functions of the microcontroller are turned off, including the crystal oscillator circuit, yielding a sleep mode current draw of less than 30 micro amps at 5.5 volts. The microcontroller of the preferred embodiment is inexpensive and small in size and weight.

Internal of the microcontroller is software written to perform a self-calibration of a pressure transducer 132. In the self-calibration mode, the microcontroller of each transmitter A performs analog to digital functions on its resident pressure transducer an analog circuitry and directly outputs this information to an operatively associated host system. This host system then generates the calibration factors particular to the individual transmitter A. Those factors are programmed into the microcontroller's low end ROM storage area. Once these calibration factors are programmed, the transmitter A is calibrated to perform accurate pressure and temperature conversions using is resonant or local pressure sensor 132. This calibration operation is carried out in the configuration shown in the figure without on-board EEPROM memory. When that memory becomes available, EEPROMS can be programmed for the self-calibration operation. Indeed, depending upon EEPROM size, it is possible to calibrate the zero pressure offset over the temperature range anticipated to minimize errors over that range.

The software internal to the microcontroller 130 incorporates mathematical functions generated from the pressure sensor specifications to: generate an actual temperature reading from the pressure sensor and to offset the temperature effects on the pressure reading from the sensor. The software also performs the function of encoding the information following the pressure/temperature conversion for RF transmission to the system receiver C. The transmissions occur approximately every 14 seconds at 25° with a battery voltage of 5.5 volts. This interval of time is specifically selected due to the F.C.C. limitations of ten seconds per transmission and because the interval time is generated by the microcontroller's watchdog timer which has an aggregate tolerance up to 30% over temperature and battery voltage.

The transmitted code sent from the transmitter A to the receiver C contains the following information: 1 bit to select encoding of the pressure/temperature, 7 bits of pressure/temperature information, 2 bits of position identification information, and 6 bits of security coded identification information. The security coded identification information is utilized to ensure data integrity in a manner described above. The transmitted information is sent in a form known as "QUAD" encoding. This form of encoding is peculiar to the direct pressure read-out system of the instant embodiment and has been developed for this system particularly. The 16 bits of data described above are compressed into 8 QUAD bits for data transmission. QUAD encoding has two major benefits; one being that the number of bits transmitted is reduced and the time duty cycle is less than that of binary/trinary encoding. Both of these benefits aid in establishing better overall system communications and prolonged battery life. The lower duty cycle permits higher peak power levels to pass the F.C.C. standards. The compression and QUAD data transmission is all accomplished by the microcontroller 130 and the RF transmission section of the circuit illustrated in FIG. 10.

The pressure sensor 132 selected for the instant transmitter is Model SCC100AH manufactured by Sensym. This pressure sensor is selected for three major reasons, but low cost and low profile TO-5 package size are two major reasons. The other reason is that the sensor is somewhat calibrated from 0°–50° C. from the manufacturer. Temperature readings are accomplished by measuring the input resistance of the sensor bridge 134. The SCC100AH sensor has a 2150 ppm/deg C. rating of resistance and has proven adequate in determining sensor temperature.

The preferred pressure sensor 132 has been designed to be driven by a constant current source 136. The sensor's output span changes over temperature by 220 ppm/deg C. Therefore, to compensate for this span over temperature, the supply voltage to the sensor itself must vary inversely to compensate for the span change. The preferred sensor has an input bridge resistance with a temperature coefficient of –2150 ppm/deg C. Therefore, by driving the sensor with a constant current source, the compensation for the entire span is accomplished.

The circuit to accomplish this constant current source is illustrated in FIG. 10. The circuit uses an op amp 138 with a fixed positive input voltage VRB. The output voltage of the op amp source is the center tap of the resistance bridge and is equivalent to the resistance of the center input bridge divided by the resistance of the inverting input of the op amp. Therefore, as the bridge input resistance increases, so too does the voltage sourcing the op amp, yielding a constant current. The circuit values are selected to maximize the current flow through the sensor 132 while maintaining a maximum op amp output voltage less than 2.5 volts. This maximum rating is established to help maintain the op amp to function within its operating limits even when the battery voltage drops to 4.5 volts.

The constant current source output VS also leads itself to accurately determining the temperature of the sensor. Since the resistance of the sensor input bridge 134 changes at 2150 ppm/deg C., the output voltage of the driving op amp 138 also changes at 2200 ppm/deg C. This change in output voltage is observed with respect to the constant voltage at non-inverting input of the op amp because the ground terminal of the sensor GND is also tied to this potential VRC.

The actual temperature reading itself is determined through mathematical calculations performed by the microcontroller 130 with respect to the 25 deg C. temperature analog to digital conversion reading. This temperature reading also aids in compensating for typical offsets and range span errors which the sensor may experience over its temperature range.

The sensor amplifier circuit 140 is a high input impedance differential amplifier. The high input impedance is used to limit the loading effect of the amplifier on the output impedance of the sensor bridge. This configuration uses a pair of amplifiers 142 having their non-inverting inputs connected together by a gain-setting resistance. This amplifier has proven to be well suited for this application because only the difference between the sensor leg voltages is amplified, not the dc component of each sensor leg +VOUT, –VOUT. The dc component is theoretically equal to about half the output of the current source amplifier less the constant voltage of the positive input of the current source. The theoretical output of the sensor positive leg amplifier is equal to:

$$[((+VOUT=-VOUT)/2)+((+VOUT--VOUT)*(20K/3.32k))]$$

The theoretical output of the sensor negative leg amplifier is equal to:

$$[((+VOUT+-VOUT)/2)-((+VOUT--VOUT)*(20K/3.32K))]$$

The output 144 of the two amplifier legs of the sensor amplifier circuit 140 is inputted directly into the microcontroller 130 through a pair of op amps 146 without further differential amplification for a number of reasons. A first reason is to eliminate additional amplifier error. Also, separate ADC readings on the sensor legs +VOUT, -VOUT allows a high degree of span/temperature/offset compensation on the sensor 132. Generally, the sum of the ADC values of these two amplifier legs at any pressure or temperature should be equal to the sum at 0 psi 25° C. This aids in compensation for the sensor errors.

The analog to digital converter system 150 used with the transmitter A illustrated in FIG. 10 is of the capacitive charge/timing variety. This type of analog to digital converter has been chosen for a number of reasons, the first being cost. In order to obtain adequate resolution, at least ten bit accuracy is required to observe the range of sensor variations. Also, the capacitive/timing variety of analog to digital conversion addresses the problem of variable supply voltages and a low current draw of the overall system. The microcontroller output pin RB4 supplies a voltage to the analog section 152, but can vary from as high as 6.5 volts to as low as 4.0 volts.

The circuit configuration of the analog to digital converter 150 is illustrated in FIG. 10. A capacitive ramp is generated by current sourcing an NPO capacitor 154 which is used as a feedback resistance. The rate at which the output voltage ramps up is a function of the charging current and the capacitance value of the capacitor. The charging current is approximately equal to the regulated voltage applied to the non-inverting input of the op amp 156 divided by the inverting input resistance. In the instant embodiment, the regulated voltage is established to be approximately 0.5 volts in order to keep the voltage level on the NPO capacitor 154 low and yet high enough to overcome the changes in voltage offset on the op amp 156 over the anticipated temperature range.

The actual analog to digital conversion is a timed conversion. The microcontroller 130 executes a timing operation using a counter beginning from the time the ramp voltage on the capacitor 154 exceeds a reference voltage to the time the ramp voltage reaches the voltage of the channel being converted.

The conversion is accomplished by first applying a high voltage signal on the inverting input of the op amp 156 to effectively "zero" the ramp voltage. The microcontroller 130 next clears the counter internal of the controller and waits for the ramp voltage on the capacitor 154 to precede the reference voltage VRC. When this happens, the reference comparator 158 outputs a low level voltage output signal. The microcontroller 130 continuously increments the internal analog to digital conversion counter until the ramp voltage on the capacitor 154 reaches the voltage of the channel being converted. Once this happens, the channel comparator 160 outputs a low level voltage output signal. The internal counter is then stopped. The count value remaining, or observed on the analog to digital conversion counter, is used as the analog to digital conversion count value of the channel.

With the preferred 1 MHz oscillator 162, the internal counter is incremented approximately every 24 microseconds. The reference voltage VRB is used as the analog to digital conversion start input to give a stable starting point over the anticipated voltage and temperature range.

The microcontroller 130 described above for use in the radio frequency transmitter A may be substituted by a Model PIC16C56XT/I manufactured by Microchip. This microcontroller is identical to the model described above, but includes an additional 1k bytes of on-board program area rather than the smaller 512 bytes used on the embodiment described above. This extra memory is handy for additional microcode to program an additional EEPROM chip which may be added to the system.

The on-board EEPROM memory within the microcontroller 130 allows for self-calibration. Calibration is performed on a large scale wherein a vast quantity of transmitters A, such as 100 transmitters for example are calibrated at a single time in a single operation. The transmitters A are connected by means of a small number of cascaded control lines that are tied to a central programming computer (not shown). The cascaded transmitters are then placed in a pressurized vessel that has a variable thermal range capabilities from -40 to 80° C. The calibration of the transmitters are accomplished via the central computer in the cascaded control lines connecting each of the transmitters to the computer. The central computer thermally cycles the transmitters in increments of 20° C. and also pressurizes the vessel from 0 psi to 50 psi at each of the 20° C. increments. For each temperature increment, the central computer commands all of the transmitters within the group to perform microcode routines which store calibration information in the EEPROM memory. The information stored includes zero pressure offset, temperature readings, and pressure multiplication factors. This self-calibration over the temperature range eliminates the error factors that are normally associated with using on the fly mathematical equations and single temperature reference values for the calibration. The calibration over the temperature range in the vessel also allows for accurate temperature information to be transmitted along with pressure from the transmitters A to the receivers C when used in their intended application on a pneumatic tire.

The microcontroller 130 described immediately above is programmed to recognize commands from a central computer. The internal program within the microcontroller acknowledges a calibration mode and, while in this mode, receives commands from a central computer. This central computer commands the microcontroller to observe pressure and temperature measurements using its own individualized resident sensor 132 and store the accumulated data for calibration on the on-board EEPROM. The data is collected over a temperature range in 20° C. increments, forming a data table which is later used as a look-up table for on-the-fly calibration.

From the calibration look-up table data, and while in a normal operating mode, the microcontroller 130 reads the digitally converted temperature value from the sensor and, using the table, extrapolates therefrom to determine what the temperature of the device actually is. This temperature value is then used to determine the zero pressure offset and multiplication factor at the current temperature. Since the data look-up table for calibration is prepared using 20° C. increments, the resulting calibrated output values for temperature and pressure are fairly accurate.

Data Integrity Checking

There are a number of mathematical schemes that can be utilized to cross-link data that is transmitted and decoded. The object of all the schemes is to devise a mathematical procedure that will cause disruption of all sections of the transmitted information, if even a single bit of the data transmitted is decoded improperly.

As an example, assume that an application requires 3 bytes of information to be communicated by RF means. Each byte contains 8 data bits. One byte contains the identification code, and the remaining two bytes contain variable data. The request for security is made so that if during decoding of the data, a bit of one of the information bytes is misinterpreted, the reception of the information is aborted. The security of the decode is accomplished by mathematically crosslinking the information bytes. The following is an example:

EXAMPLE #1

| Data to transmit: | A = VARIABLE DATA BYTE #1 |
|---|---|
| (3 BYTES) | B = VARIABLE DATA BYTE #2 |
| | C = SYSTEM ID. CODE BYTE |

If just the variables A, B, and C, were transmitted, it may be possible that only the "A" variable is disrupted during decoding. The receiver will decode a proper identification byte, "C", and accept the incorrect data in "A".

According to the present invention, instead of transmitting just the three bytes, A, B, and C, the following mathematics are applied via the transmitting microcontroller:

D = A "exclusive or" B
E = B "exclusive or" C
F = (A "exclusive or" C) + B

NOTE:
OVERFLOW ON SUMMATION OF "B" ARE IGNORED. THE BORROW ON DECODE COMPENSATE FOR OVERFLOWS

The information bytes D, E, and F are transmitted instead of A, B, and C respectively.

On receiving 3 bytes of data, the microcontroller 88 within the receiver performs the following mathematics to re-establish the original data:

B = F - (D "exclusive or" E)
C = B "exclusive or" E
A = B "exclusive or" D

If upon decoding, the data received is disrupted, all three bytes will be incorrect. This allows the receiver to detect even the slightest error via the incorrect identification byte.

EXAMPLE #2

I. GIVEN:     A          B          C
              11010101   11100100   01100001
   CROSS-LINK THE DATA FOR TRANSMIT:
   D = A "exclusive or" B
   D = 00110001
   E = B "exclusive or" C
   E = 10000101
   F = (A "exclusive or" C) + B
   F = 1 10011000 - IGNORING OVERFLOW
   F = 10011000
II. TRANSMIT:     D          E          F
                  00110001   10000101   10011000

III. If the data is received correctly, then the following will occur:
     D          E          F
     00110001   10000101   10011000
   THEN:
   B = F - (D "exclusive or" E)
   B = 1 11100100 - IGNORE BORROW
   B = 11100100
   C = B "exclusive or" E
   C = 01100001
   A = B "exclusive or" D
   A = 11010101
   All data decoded correctly. "C" matches the system ID that the receiver is looking for.
IV. If the data is received incorrectly, them the following will occur: Assume "D" incorrect.
     D          E          F
     00111001   10000101   10011000
   THEN:
   B = F - (D "exclusive or" E)
   B = 1 11011100 - IGNORE BORROW
   B = 11011100
   C = B "exclusive or" E
   C = 01011001
   A = B "exclusive or" D
   A = 11100101
   All three bytes of information have been disrupted, causing "C" to not match the system identification. Code that the receiver is looking for. The receiver aborts the reception.

The principle of mathematical cross-linking described above will also work for transmissions of three (3) or more bytes of data if suitably adapted or otherwise modified as understood by those skilled in the art having the benefit of the above discussion and examples.

For two (2) bytes of transmitted data (1 variable data, 1 ID), the following equations apply:

| DATA TO TRANSMIT: | $A$ = Variable Data |
|---|---|
| | $B$ = System ID |
| CROSSLINK: | $C = A + B$ |
| | Ignore Carry-Overs |
| | $D = A - B$ |
| SEND: | $C, D$ |
| ON RECEIVE: DECODE: | $A = \dfrac{C + D}{2}$ |
| | Borrows will compensate for carry-overs above |
| | $B = \dfrac{C - D}{2}$ |

The "$B$" variable must match the system ID in order for the "$A$" data to be accepted.

The security method outlined above can also be used in conjunction with other methods of security. For example, combining the mathematical cross-link security with added checksum data will yield additional security.

The invention has been described with reference to the preferred embodiments. Modifications and alterations will occur to others upon the reading and understanding of this specification. It is our intention to include all such modifications and alterations insofar as they come within the scope of the appended claims or equivalents thereof.

Having thus described the invention, we now claim:

1. A method of monitoring the condition of a non-rotating pneumatic tire for use with a monitoring system having a transmitter device including a power supply, a condition sensor for sensing a condition other than vibration of said tire, a microcontroller and a radio signal generating circuit, and a receiving device for receiving radio signals, the method comprising the steps of:

disposing the transmitter device within the pneumatic tire;

applying a momentary physical vibration to said tire while maintaining said tire in a non-rotating state;

sensing application of said physical vibration being applied to said pneumatic tire while the tire is stationary;

enabling a microcontroller by connection of the microcontroller to the power supply through a first switch responsive to the sensed physical vibration;

sensing said pneumatic tire condition other than said vibration with said condition sensor;

controlling the radio signal generating circuit with the enabled microcontroller to generate a radio signal representative of said sensed pneumatic tire condition; and receiving the generated radio signal with the receiver device.

2. The method of monitoring the condition of a pneumatic tire according to claim 1, wherein said step of enabling said microcontroller by connection of the microcontroller to the power supply through said first switch responsive to said sensed physical vibration of said non-rotating tire includes the steps of:

intermittently closing contacts of a vibration switch on the transmitter device; and operating said first switch when said intermittently closing contacts of said vibration switch are closed.

3. The method of monitoring the condition of a pneumatic tire according to claim 2, wherein said step of operating said first switch when said intermittently closing contacts of said vibration switch are closed includes the steps of:

providing a buffering circuit in said first switch, the buffering circuit having a characteristic time constant;

connecting said microcontroller to the power supply through said first switch responsive to i) said intermittently closing contacts being closed and ii) said buffering circuit being in a first state; and maintaining said microcontroller connected to said power supply while said buffering circuit remains in said first state for at least a time period corresponding to said buffering circuit characteristic time constant.

4. The method of monitoring the condition of a pneumatic tire according to claim 1, wherein said step of enabling said microcontroller by connection of the microcontroller to the power supply through said first switch responsive to said sensed physical vibration of said non-rotating tire includes the steps of:

generating a first voltage signal in response to said sensed vibration; and operating said first switch exclusively in response to said first voltage signal.

5. The method of monitoring the condition of a pneumatic tire according to claim 4, wherein said step of operating said first switch exclusively in response to said first voltage signal includes the steps of:

providing a buffering circuit in said first switch, the buffering circuit having a characteristic time constant;

connecting said microcontroller to the power supply through said first switch responsive to i) an amplified first voltage signal and ii) said buffering circuit being in a first state; and maintaining said microcontroller connected to said power supply while said buffering circuit remains in said first state for at least a time period corresponding to said buffering circuit characteristic time constant.

6. A method of monitoring the condition of a non-rotating pneumatic tire for use with a monitoring system having a transmitter device including a power supply, a condition sensor, a microcontroller and a radio signal generating circuit, and a receiving device for receiving radio signals, the method comprising the steps of:

disposing the transmitter device within the pneumatic tire;

placing a hand-held external electromagnetic signal generating device inclose proximity to said tire while maintaining said tire in a non-rotating state;

sensing application of said external electromagnetic signal generated inclose proximity to said tire;

enabling a microcontroller by connection of the microcontroller to the power supply through a first switch responsive to said sensed external signal;

sensing said pneumatic tire condition with said condition sensor;

controlling the radio signal generating circuit with the enabled microcontroller to generate a radio signal representative of said sensed pneumatic tire condition; and receiving the generated radio signal with the receiver device, wherein said step of enabling said microcontroller by connection of the microcontroller to the power supply through said first switch responsive to said sensed external electromagnetic signal further includes the steps of;

amplifying said sensed external electromagnetic signal to form an amplified first command signal for immediate and direct use by said first switch;

operating said first switch exclusively in a presence of said first command signal;

providing a buffering circuit in said first switch, the buffering circuit having a characteristic time constant;

connecting said microcontroller to the power supply through said first switch responsive to i) said first command signal and ii) said buffering circuit being in a first state; and maintaining said microcontroller connected to said power supply while said buffering circuit remains in said first state for at least a time period corresponding to said buffering circuit characteristic time constant.

7. A method of monitoring the condition of a non-rotating pneumatic tire for use with a monitoring system having a transmitter device including a power supply, a condition sensor, a microcontroller and a radio signal generating circuit, and a receiving device for receiving radio signals, the method comprising the steps of:

disposing the transmitter device within the pneumatic tire;

placing a hand-held external electromagnetic signal generating device inclose proximity to said tire while maintaining said tire in a non-rotating state;

sensing application of said external electromagnetic signal generated inclose proximity to said tire;

enabling a microcontroller by connection of the microcontroller to the power supply through a first switch responsive to said sensed external signal;

sensing said pneumatic tire condition with said condition sensor;

controlling the radio signal generating circuit with the enabled microcontroller to generate a radio signal representative of said sensed pneumatic tire condition; and receiving the generated radio signal with the receiver device, wherein said step of enabling said microcontroller by connection of the microcontroller to the power supply through said first switch responsive to said sensed external electromagnetic signal further includes the steps of;

providing a buffering circuit in said first switch, the buffering circuit having a characteristic time constant;

connecting said microcontroller to the power supply through said first switch responsive to i) a first command signal and ii) said buffering circuit being in a first state; and maintaining said microcontroller connected to said power supply while said buffering circuit remains in said first state for at least a time period corresponding to said buffering circuit characteristic time constant.

* * * * *